Nov. 16, 1954 — C. W. OHLY — 2,694,391
VALVE SPRING RETAINER LOCK AND OIL SEAL
Filed April 10, 1951

Inventor
Charles W. Ohly
by
Attys

United States Patent Office 2,694,391
Patented Nov. 16, 1954

2,694,391

VALVE SPRING RETAINER LOCK AND OIL SEAL

Charles W. Ohly, Cleveland Heights, Ohio, assignor to Thompson Products, Inc., Cleveland, Ohio, a corporation of Ohio Application April 10, 1951, Serial No. 220,218

1 Claim. (Cl. 123—188)

The present invention relates to split lock rings for valves and especially to a lock ring of the type used on a stem of a valve of an overhead assembly such as is commercially used in automotive vehicles.

Due to the presence of the gap or split in the conventional valve stem lock ring, oil is free to pass in considerable quantities through said gap and along the stem of the valve into the combustion chamber. Needless to say, the presence of an excess of oil results in gumming of the valve and carbonization, as well as loss of oil which is detrimental to efficient engine operation.

I propose, in accordance with the features of this invention to use advantageously the gap or slot in the lock ring as a means for actually metering the oil through the lock ring and whereby an amount of oil only sufficient to lubricate the stem is permitted to pass through the ring.

At the present time the gap between the ends of the conventional split lock ring varies from .030 inch to .060 inch. However, no effort has been made to control this gap. As far as I know, I am the first to propose using the gap to perform the additional function of actually metering oil to the valve stem in prescribed quantities sufficient only for stem lubricating purposes.

In accordance with the features of this invention there is provided for use with a valve having a stem with a lock ring groove near its extremity and located inside of a lock ring opening in a valve spring retaining cap; a split lock ring for disposition around the stem in the cap and in cooperation with the stem groove comprising a split circular member having vertical gaps extending between the upper and lower edges of the member, the side edges of the member defining each gap being projected, upon wedging of the ring in the cap, toward each other to restrict the size of each gap to less than .010 inch so as to form the gap into an oil metering passage of a size to permit seepage of oil therethrough only sufficient for valve stem lubricating purposes.

More specifically I propose to form each gap between the ends of the split lock ring into a restricted oil metering passage in the order of .0036 inch to .009 inch.

Other objects and features of this invention will more fully appear from the following detailed description taken in connection with the accompanying drawings which illustrate a single embodiment thereof and in which.

As shown on the drawings.

Figure 1:
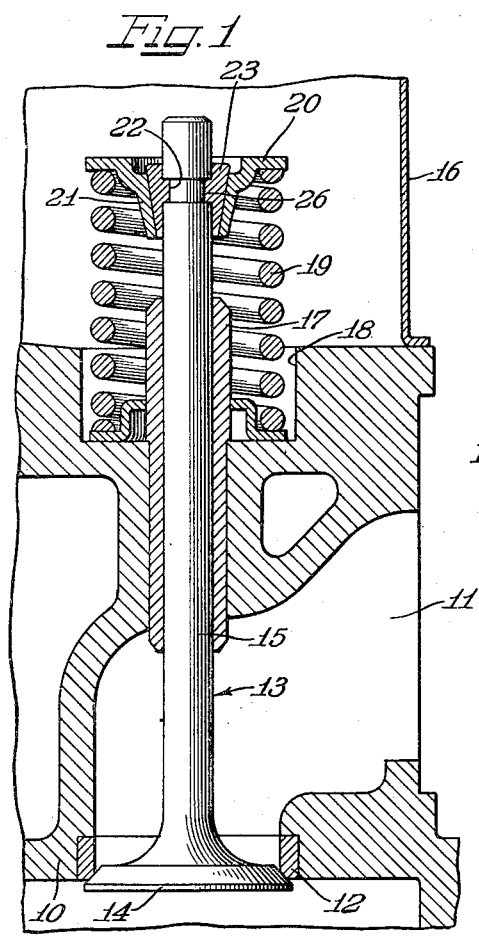
Figure 1 is a fragmentary cross sectional view through an overhead type valve assembly of an engine showing the valve in elevation and provided with a lock ring having the features of this invention.

The reference character 10 designates generally an internal combustion engine block having a fluid passage 11 terminating in a valve seat 12. Cooperating with this valve seat 12 is a poppet valve 13 which is of conventional construction and includes a head 14 engageable on the seat 12. The stem 15 of the valve terminates at its free end in a housing or cover 16 which, as is well known in the engine art, encloses the usual rocker arm mechanism (not shown) for engaging the upper end of the stem to reciprocate the valve in a predetermined timed cycle.

The stem 15 extends through the usual bearing or liner 17 in the engine block and is reciprocable in this bearing. The block is also recessed in the usual way at 18 to receive the lower end of the compression spring 19 encircling the upper end of the stem 15. In other words the lower end of the spring is seated in the usual way in the recess 18.

The upper end of the spring is retained and cooperates with the so-called retaining cap which has a downwardly depending tubular frusto-conical portion 21 encircling the upper end of the stem. Thus the spring 19 is retained under compression between the cap 20 and bottom of the recess 18.

The upper end of the stem 15 inside the cap 20 has the usual groove 22 for cooperation with a split lock ring 23 adapted to be wedged in the frusto-conical portion 21 of the cap 20. It is with this lock ring that my present invention is particularly concerned.

The lock ring 23 has an outer frusto-conical surface 24 for wedging cooperation with the mating frusto-conical surface 25 in the portion 21 of the cap. In addition, the lock ring has provided at its inner surface an annular rib 26 engageable in the stem groove 22 (Fig. 1).

Figure 2:
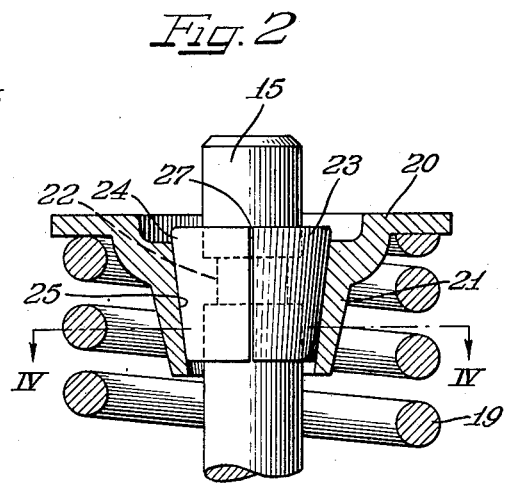
Figure 2 is an enlarged fragmentary cross sectional view corresponding with the upper portion of the valve assembly in Figure 1, but showing the lock ring in elevation.
Figure 3:
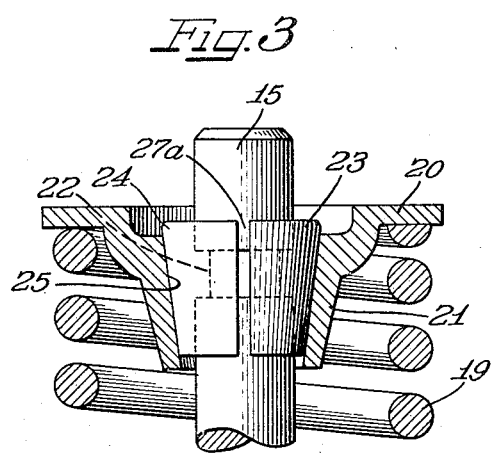
Figure 3 is a fragmentary sectional view similar to Figure 2 but showing the lock ring provided with the conventional large gap or slot.
Figure 4:
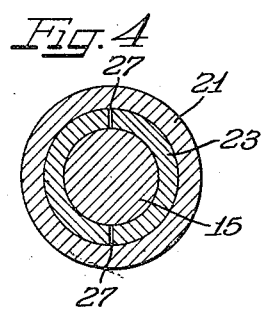
Figure 4 is a cross sectional view taken on the line IV—IV of Figure 2 looking downwardly.

Now in Figs. 2 and 4 I have shown a lock ring with metering vertical gaps 27 embodying the features of this invention, whereas in Figure 3 I have shown the lock ring with the conventional large gaps designated by the reference numeral 27a. Since all the other parts of these two illustrations, Figures 2 and 3, are identical, the same reference numerals are being used to identify corresponding parts.

In the conventional lock ring, shown in Figure 3, each vertical gap 27a is shown in the order of .030 inch to .060 inch. Actually no effort is made to control the size of the gap from the standpoint of controlling the flow of oil through the lock ring. As a consequence oil accumulating in the retaining gap 20 is free to flow in excess quantities through the gap 27a and along the portion of the valve stem therebelow, resulting in an excess quantity of oil entering the combustion chamber. This is particularly true when the parts of the engine have become worn.

Normally the gap between the ends of the split lock ring is provided to permit of the ring being resiliently wedged tightly between the cap and the valve stem. I propose, in accordance with the features of this invention to use this gap 27 for a new and additional purpose, namely, that of controlling and metering the oil or lubricant flowing through the lock ring so that excess quantities of oil will not pass therethrough on to the valve stem. In other words, I proportion the size of the gap so that it will only permit of a trickle of oil therethrough sufficient for valve stem lubricating purposes.

I have ascertained that satisfactory results from an oil metering standpoint may be obtained if the width of the gap is maintained somewhere between .0036 inch and .009 inch or in other words less than .010 inch. With a metering gap of a size falling between the range noted above, I find that the flow of oil through the lock ring can be effectively controlled so that only an amount sufficient for lubricating the stem is permitted to pass through the gap, it will be appreciated that, since two gaps 27 are used in ring 23, the combined width of the two gaps is less than 0.20 inch and more than .007 inch when the ring is wedged in the cup 20. This is true even though in wedging the ring 23 in the cup 20 the edges of one gap 27 may be closer together than those of the other size if one gap 27 is smaller the other is automatically made larger, so that the combined width of both gaps still remains the same.

It will be understood that modifications and variations may be effected without departing from the scope of the novel concepts of the present invention.

I claim as my invention:

In a lock ring structure for a lubricated valve stem having a groove near its extremity for the lock ring, and a spring retaining cap having a frusto-conical opening defining a wedge surface about and spaced from the grooved end of the stem, a split lock ring engaged in said stem groove and extending into said cap opening with an outer inclined surface for wedging engagement with said cap wedge surface and having gaps extending in the direction of the length of the stem, each of said gaps being normally of the order of approximately .0036 inch to .009 inch to define an oil metering passage, said gaps, upon wedging of the ring in the cap about the stem to restrict the flow of oil through the gap to an extent only sufficient for valve stem lubricating purposes, having a combined width of the order from .007 inch to less than .020 inch, each gap being substantially vertically straight throughout the width of said ring and free of obstructions and metering solely by itself throughout its length.

References Cited in the file of this patent

UNITED STATES PATENTS

| Number | Name | Date |
| --- | --- | --- |
| 1,594,517 | Dufty | Aug. 3, 1926 |
| 2,191,333 | Willgoos | Feb. 20, 1940 |
| 2,419,708 | Cummings | Apr. 29, 1947 |
| 2,572,106 | Burrell | Oct. 23, 1951 |